United States Patent [19]

Rogers

[11] 3,722,325
[45] Mar. 27, 1973

[54] TORQUE CONVERTER
[76] Inventor: Beverly W. Rogers, Route 1, Box 630, Summerville, S.C. 29483
[22] Filed: Aug. 11, 1971
[21] Appl. No.: 170,872

[52] U.S. Cl. ........................74/751, 74/752 F, 74/710
[51] Int. Cl. ............F16h 3/74, F16h 5/42, F16h 1/38
[58] Field of Search ..........................74/751, 752 F

[56]     References Cited
       UNITED STATES PATENTS

| | | | |
|---|---|---|---|
| 1,741,854 | 12/1929 | Lyman et al. | 74/752 F |
| 1,928,244 | 9/1933 | Berlin | 74/751 |
| 2,149,560 | 3/1939 | Teece et al. | 74/751 |
| 2,894,417 | 7/1959 | Boling | 74/751 |
| 2,984,124 | 5/1961 | Keyser | 74/751 |

*Primary Examiner*—Arthur T. McKeon
*Attorney*—T. Russell Foster

[57]            ABSTRACT

A torque converter of the mechanical type for transmitting power from power means such as a motor to a driven member from which power take-off may be obtained which includes a rotatably mounted ring gear for rotation by the motor having teeth engagable with a drum having a cam groove rotatably mounted on the driven member with one or more weights being guidably mounted on the driven member and engagable with the cam groove so that rotation of the drum by the ring gear moves the weights in a reciprocating manner at a speed proportional to the speed of the ring gear so as to impart periodic inertial forces to the driven member for smoothly transmitting torque from the motor to the driven member throughout the entire speed range from rest to full speed.

7 Claims, 4 Drawing Figures

3,722,325

INVENTOR
BEVERLY W. ROGERS

T. Russell Foster
BY ATTORNEY

TORQUE CONVERTER

A wide variety of devices have been proposed and many have been put into use over the years for the transmission of power in a smooth uniform manner from power means such as an internal combustion engine to a device to be driven such as the wheels of an automobile. Such devices are generally referred to as automatic transmissions or torque converters and utilize a wide variety of constructions such as clutches, fluid couplings, etc. The basic purpose which all of such torque converters are designed to accomplish is to transmit power from a motor which is operating at a relatively high speed to driven components which must be brought up to a selected speed from a position of rest. A common technique incorporated in such transmissions is to utilize a series of gears by means of which power is transmitted to the driven components at an initially low speed with one set of gears then brought up to the desired speed by utilizing one or more additional set of gears controlled by the operator. Other torque converters such as fluid couplings are designed to accomplish this same purpose but all of such devices have not only been expensive but are characterized by a large number of component parts with attendant wear and need for frequent replacement. Furthermore, such present day devices although operating somewhat satisfactorily still have not attained the level of efficiency desired in that they are not able to produce an absolutely smooth transmission of power from start to full speed without some loss of power which could be converted to useful work.

Accordingly, a primary object of this invention is to provide a new and novel torque converter.

Another object of this invention is to provide a new and novel torque converter for transmitting power from a driving member to a driven member to be accelerated from a position of rest to the desired operating speed.

A further object of this invention is to provide a new and novel torque converter by means of which a relatively high speed motor such as an internal combustion engine can be drivably connected to the wheels of an automobile so as to smoothly and uniformly bring the speed of the wheels up to approximately the speed of the motor with a maximum degree of efficiency and with a minimum loss of power.

This invention further contemplates the provision of a new and novel transmission unit for transmitting power from power means to driven means in an automatic manner, which utilizes a minimum of parts and with a minimum of wear so as to be virtually noiseless and maintenance free, which is characterized by a low initial cost and which is capable of prolonged use without breakdown.

Still another object of this invention is to provide a new and novel automatic transmission for an automobile by means of which the automobile engine may be connected to the wheels through a novel arrangement of differential gearing so as to produce a maximum utilization of power and an optimum performance of the vehicle.

Other objects and advantages of the invention will become apparent from the following description taken in connection with the accompanying drawings.

In general, the objects of this invention are accomplished by providing power means connected by suitable means to a rotatably mounted driving member. Inertia means are provided which are rotatably mounted on rotatably mounted driven means. Interconnecting means are provided on the driving member and on the inertia means for rotating both the inertia means and the driven member simultaneously during the rotation of the driving member. The inertia means includes weight means guidably mounted on the driven member for reciprocating movement during the rotation of the inertia means by the driving member at a speed directly proportional to the rotational speed of the inertia means by the driving member. As the speed of rotation of the driving member is increased the effect of the inertia means on the driven member increases proportionally so as to bring the speed of the driven member smoothly up to the speed of the driving member.

The novel features which are believed to be characteristic of the invention are set forth with particularity in the appended claims.

The invention itself, however, both as to its organization and method of operation may be best understood by reference to the following description taken in conjunction with the accompanying drawings in which.

Figure 2:
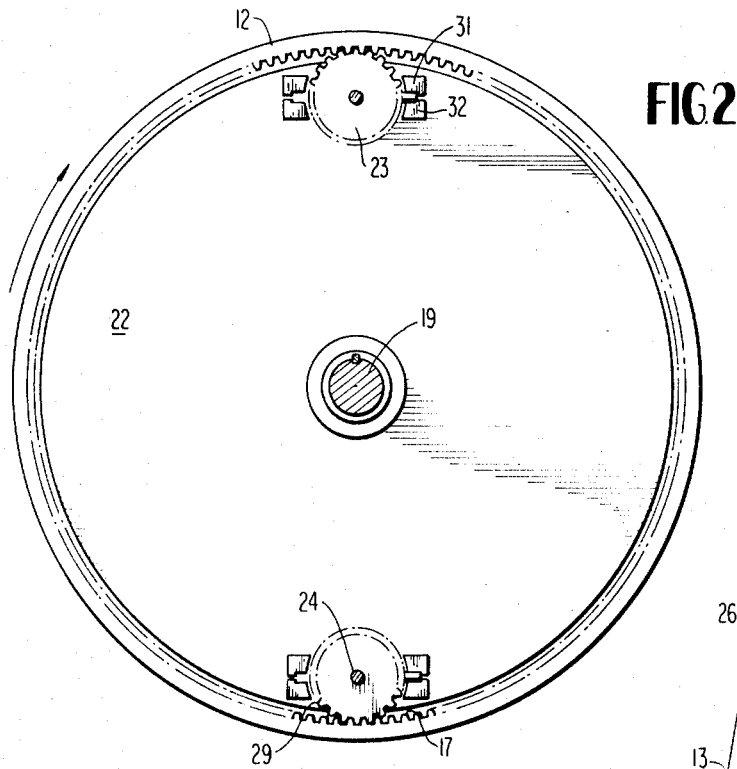
FIG. 2 is a sectional view taken substantially along line 22 of FIG. 1 in the direction of the arrows.
Figure 1:
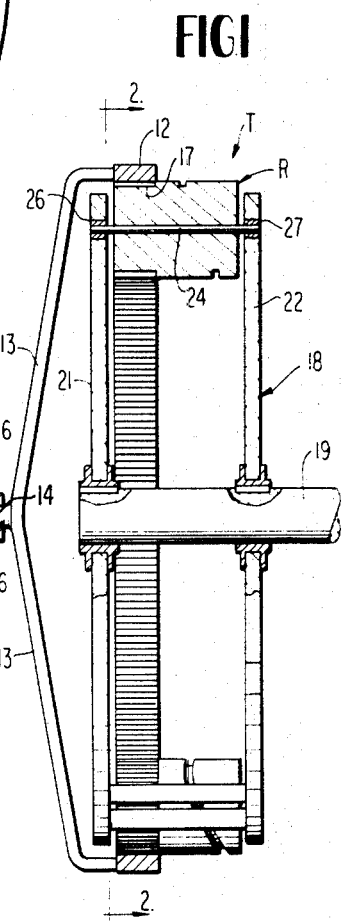
FIG. 1 is a side elevation view partially in section of a torque converter constructed in accordance with the invention.

Referring now to the drawings and to FIG. 1 in particular, there is shown a torque converter constructed in accordance with the invention and designated generally by the letter T. The torque converter T is arranged to be connected to any type of power means such as a motor 11 which may be an internal combustion engine of the type commonly found in vehicles such as automobiles. The torque converter T is arranged to be connected to a unit to be driven such as the wheels of an automobile as described hereinafter with reference to the embodiment of FIG. 4.

The torqu converter T includes a rotatably mounted driving member such as a ring gear 12 to the power means or motor 11. In the illustrated embodiment, the connecting means may include a spider having arms 13 suitably secured by welding or the like to an input shaft 14 suitably mounted for rotation in bearings 16. As is well known, the input shaft 14 may be drivably connected in any suitable manner to the output shaft (not shown) of the motor 11.

The driving member or ring gear 12 is provided with a continuous row of gear teeth 17 on its inner periphery in the well-known manner. The torque converter T also includes a rotatably mounted driven member designated generally by the numeral 18 which may be connected in any suitable manner to the unit to be driven such as the wheels of an automobile as referred to above. The driven member 18 includes an output shaft 19 on which is suitably mounted by welding or the like a pair of spaced plates 21, 22 arranged in the axially spaced relationship.

The torque converter T includes inertia means designated generally by the letter R which are rotatably mounted on the driven member 18. More specifically, the inertia means include one or more cylindrical members or drums 23 rotatably mounted on the driven member or, more specifically on the plates 21, 22 by suitable means such as a shaft 24, the opposite ends of which are journalled in openings 26, 27 in the plates 21, 22 respectively. In the illustrated embodiment, two of such drums 23 are provided in diametrically opposed relationship but it should be understood that any suitable number of drums may be utilized. It will be noted that the drums 23 are rotatably mounted adjacent the peripheral edges of the plates 21, 22.

Interconnecting means are provided on the driving member or ring gear 12 and the inertia means R for simultaneous rotation of both inertia means R and driven member 18. More specifically, an end portion of the outer periphery of the drums 23 is provided with circumferentially extending gear teeth 29 which mesh with the teeth 17 on the ring gear 12 so that the rotation of the ring gear rotates the drums 23 through the interengaging teeth 17, 29.

Figure 3:
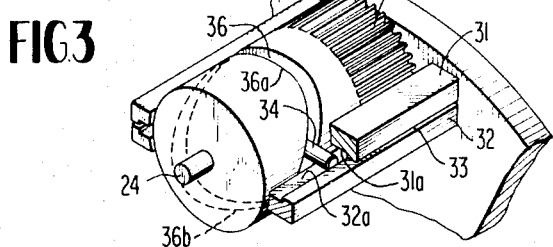
FIG. 3 is a perspective view of a portion of the apparatus of FIG. 1.

The inertia means R include weight means guidably mounted on the driven member 18 for reciprocating movement during the rotation of the inertia means at a speed directly proportional to the rotational speed of the inertia means as determined by the speed of rotation of the driving member or ring gear 12. More specifically, a pair of guide members 31, 32, arranged in spaced relationship, are secured at each end to the inner surfaces of the plates 21, 22 on opposite sides of the drums 23 as shown best in FIG. 3. The guide members 31, 32 define therebetween a gap 33 and the adjacent surfaces of the guide members 31, 32 are notched at 31a, 32a to accommodate a weight 34 which may be of any suitable shape such as a rod.

The inner end of each of the rods or weights 34 is arranged to be received within a continuous groove 36 in the periphery of the drum 23. As can be seen, the groove 36 extends in one direction along the outer periphery of the drum 23 throughout one-half of the circumference of the drum and extends in the opposite direction throughout the other half of the drum circumference, the points at which groove direction is reversed or the terminal points being indicated by the numerals 36a, 36b. Thus, as the drum 23 is rotated by the ring gear 12, the weights 34 change direction twice during each drum rotation so as to reciprocate back and forth at a speed proportional to the rotational speed of the drum 23 and ring gear 12.

In the operation of the invention, the motor 11 is operated so that its drive shaft, connected to the shaft 14, rotates the ring gear 12. As the ring gear rotates, the ring gear teeth 17 meshing with teeth 29 on drum 23 rotate the drum so that the weights 34 are moved reciprocally and guidably within the guide members 31, 32 as the weights follow the continuous groove 36. As the weights 34 reach the points 36a, 36b the ends of the path traversed by the weights, and reverse direction, an inertial force is applied to the driven member 18 so that rotation of the driven member 18 is initiated. The inertial force thus applied to the driven member 18 is proportional to the speed of the drum 23. As the driven member 18 increases its speed of rotation, the inertial force diminishes, thereby providing a smooth transmission of power from the motor 11 to the device connected to the output shaft 19 of the driven member 18.

Figure 4:
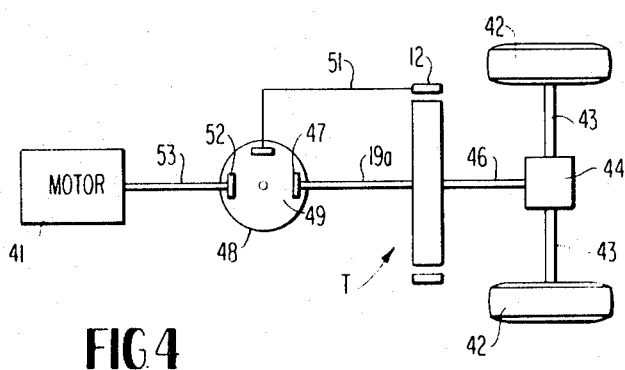
FIG. 4 is a schematic diagram of a drive system incorporating the torque converter of the invention.

Referring now to FIG. 4, there is shown one specific arrangement for which the torque converter T of the invention is particularly adaptable. In the schematic showing of FIG. 4 the torque converter T is included in the drive train of a vehicle such as an automobile having a motor 41 and driven rear wheels 42 arranged to be driven through axle 43 operatively connected in the conventional manner to a differential 44 of conventional construction.

As is well known, one end of a drive shaft 46 is connected to the differential 44 in the conventional manner with its other end suitably connected to the output or driven shaft 19 of the torque converter T. The output or driven shaft 19 of the torque converter T is extended on the other side or outwardly from the plate 21 to form shaft extension 19a. The shaft extension 19a is outer end to one of the driven gears 47 in the epicyclic gear train of a second differential 48 also of conventional construction. The second differential 48 includes, as is well known, a main driving gear 49 which is suitably connected by means of shaft assembly 51 to the ring gear 12 of the torque converter T. The other gear 52 of the differential 48 is connected by means of shaft 53 to the output shaft of the automobile 41.

While there has been described what at present is considered to be the preferred embodiment of the invention, it will be understood by those skilled in the art that various changes and modifications may be made therein without departing from the invention.

Having thus described the invention, what is claimed is:

1. A torque converter for use with associated power means comprising, in combination, a rotatably mounted driving member, means for connecting said driving member to said associated power means, a rotatably mounted driven member, inertia means rotatably mounted on said driven member, interconnecting means on said driving member and said inertia means for rotating said inertia means and said driven member, said inertia means including weight means guidably mounted on said driven member for reciprocating movement during the rotation of said inertia means at a speed directly proportional to the rotational speed of said inertia means by said driving member.

2. A torque converter in accordance with claim 1 wherein said inertia means comprises at least one cylindrical member rotatably mounted on said driven member and wherein said interconnecting means include means for drivably interconnecting said driving member and said cylindrical member having a continuous peripheral groove for moving said said guidably mounted weight means reciprocally during the rotation of said cylindrical member.

3. A torque converter in accordance with claim 2 wherein the axis of rotation of said cylindrical member is arranged in substantially parallel relationship with the axis of rotation of said driven member.

4. A torque converter in accordance with claim 3 including a plurality of said cylindrical members on said driven member and wherein said plurality of cylindrical members are drivably interconnected by said interconnecting means to said driving member.

5. A torque converter in accordance with claim 3 wherein said interconnecting means comprises gear means on said driving member and said cylindrical member arranged in meshing engagement.

6. A torque converter in accordance with claim 5 including guide means on said driven member adjacent said cylindrical member and extending in substantially parallel relationship with the axis of rotation of said cylindrical member and said driven member, and wherein said weight means include a pair of weights arranged in said guide means adjacent the periphery of said cylindrical member and in diametrically opposed relationship therewith, said weights being slidingly engageable with said continuous peripheral groove for said reciprocating movement in said guide means during the rotation of said cylindrical member.

7. A torque converter in accordance with claim 6 wherein said associated power means comprises a motor having an output shaft and including a first differential gear, a pair of wheels connected to said first differential gear, means for drivably connecting said driven member to said first differential gear and wherein said means for connecting said driving member to said associated power means comprises a second differential, and means for connecting said second differential to said driven member.

* * * * *